JUNPEI INAGAKI &
MASATERU KUNIYOSHI,
INVENTORS

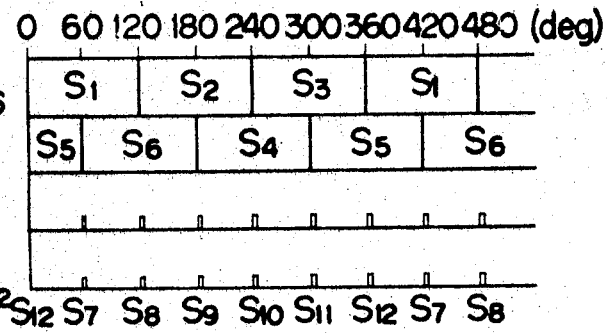
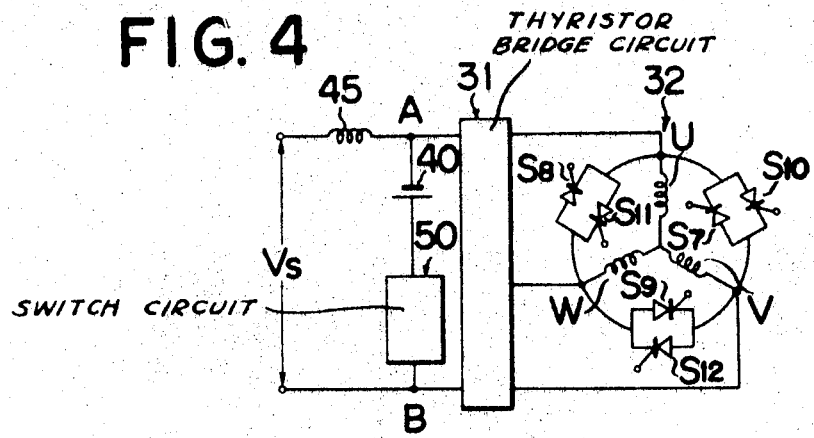
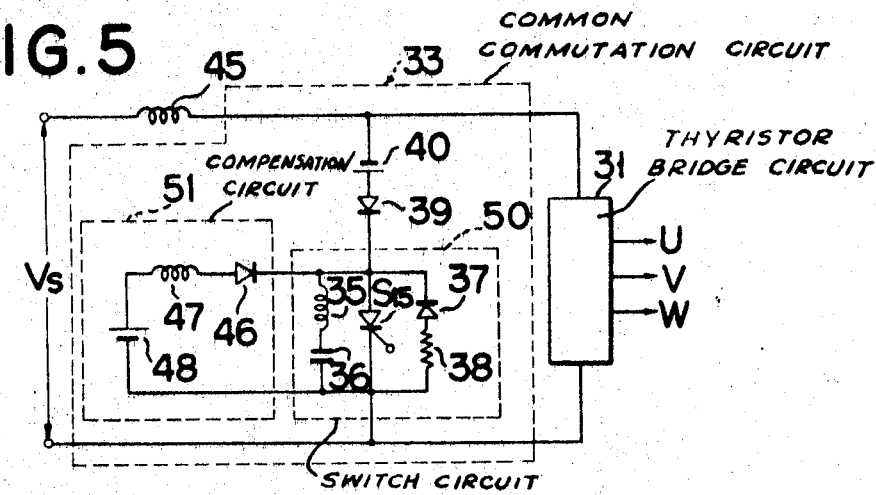

United States Patent Office 3,522,499
Patented Aug. 4, 1970

3,522,499
BRUSHLESS MOTOR HAVING IMPROVED SOLID STATE COMMUTATION
Masateru Kuniyoshi and Junpei Inagaki, Yokohama-shi, Japan, assignors to Tokyo Shibaura Electric Co., Ltd., Kawasaki-shi, Japan, a corporation of Japan
Filed Sept. 26, 1967, Ser. No. 670,565
Claims priority, application Japan, Sept. 28, 1966, 41/63,500; Feb. 1, 1967, 42/6,020; Apr. 6, 1967, 42/21,489; Apr. 10, 1967, 42/22,550; Apr. 18, 1967, 42/24,275; May 23, 1967, 42/32,277
Int. Cl. H02k 27/00
U.S. Cl. 318—158                     8 Claims

ABSTRACT OF THE DISCLOSURE

A brushless A.C. synchronous motor wherein the armature is excited by A.C. outputs from a multi-phase thyristor bridge actuating. The control of the angle at which each of the thyristors for the thyristor bridge is fired is carried out by following the prescribed sequence according to the outputs obtained by passing through the gate control circuit the outputs from a detector to define the position of rotation angle of a rotor of the motor. The gate control circuit has a self start compensation circuit to ensure that the motor will start regardless of the position of the rotor.

---

The present invention relates to a brushless motor and more particularly to a brushless motor utilizing a thyristor bridge circuit which provides improved commutating efficiency at start and under heavy load.

One, form of brushless motor using a semiconductor controlled rectifier or thyristor comprises a position detector directly engaged with a rotor to actuate a gate driving circuit, and thyristors constituting armature switches which are controlled by the position detector. In such a motor, there existed a specific rotation position, where no outputs were obtained from the position detector and consequently the thyristor was not turned on, thus, a region existed where the position detector did not get sensitised, so that there were occasions where it was possible for the motor not to self-start.

Furthermore, the prior art brushless motor, for which there was used either a commutating method based on inverted electromotive force or a natural commutating method, was handicapped by the fact that it had a low commutating power at start and under heavy load. Consequently there is a need for a brushless motor which not only has improved commutating power but which also allows the commutation advancing angle to be varied at will.

The system heretofore employed comprised assembling a three-phase thyristor bridge and a three-phase synchronous motor, connecting condensers in a delta connection between the lines on the A.C. side of the thyristor bridge and connecting a shorting commutating circuit to the D.C. side of the thyristor bridge. In this system it was common practice to control speed by the Ward-Leonard system. To carry out reduction in speed, instant stop or rapid reverse rotation, the sequence from the position detector to the thyristor gate of the brushless motor was electronically changed, and regenerative braking was applied during part of the speed control process. However, the prior art speed control system has the drawbacks that at the time of regenerative braking, the thyristor bridge of the brushless motor changed from a thyristor bridge to a converter type and the polarity on the D.C. side also reversed its direction, so that with the conventional apparatus comprising a shorting commutation circuit alone, the charging load of the condenser in the shorting commutation circuit was reduced with the resultant failure of the thyristor to be turned off. Further, the prior art system had other shortcomings. Since the thyristor for short circuiting was not theoretically required to actuate, the system had extra means specifically to break gate pulses. Hence, there was need for a compensation circuit for shorting the commutation circuit which would enable a switching element such as the thyristor in the short circuit to be turned off assuredly even at the time of regenerative braking.

It is accordingly the object of the present invention to provide a brushless motor wherein outputs from a position detector are supplied through a self start compensation circuit to a gate driving circuit so as to eliminate the unsensitised region of the position detector, and various compensation circuits for shorting are provided on the D.C. input side of the thyristor bridge to improve the commutating efficiency at start and under heavy load and freely vary the commutation advancing angle, thus ensuring the reliable operation of the motor even at the time of regenerative braking.

Other objects, features and advantages of the invention will become apparent, and its construction and operation better understood, from the following detailed description, read in conjunction with the accompanying drawings wherein:

FIG. 3 is a diagram showing the sequence of thyristors to be turned on;

Figure 6:
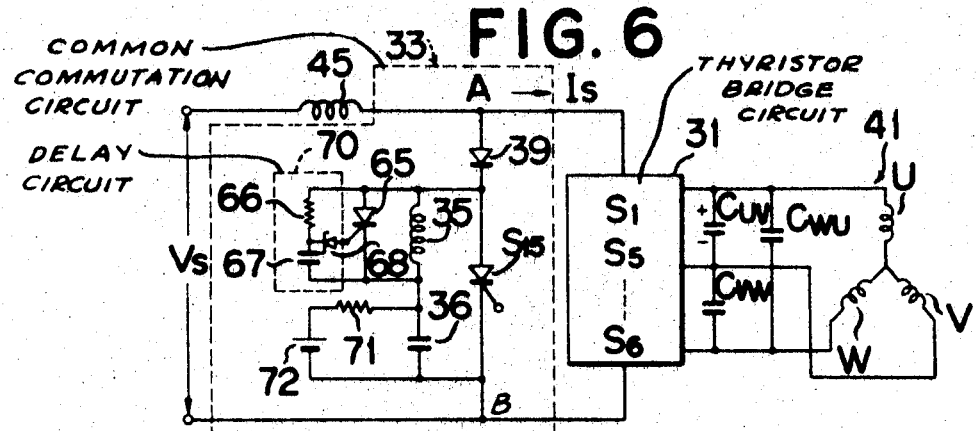
Figure 7:
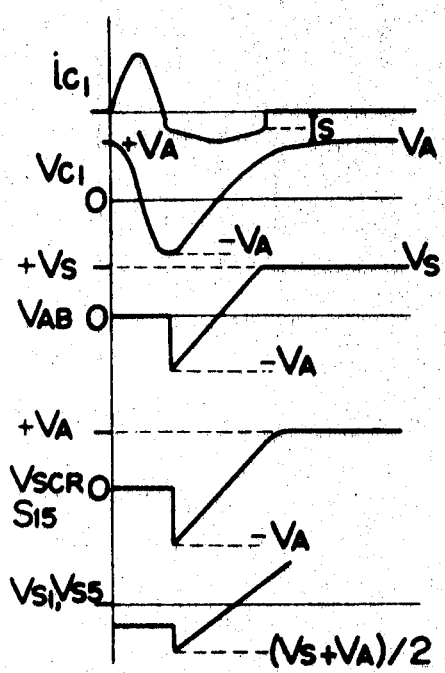
Figure 9:
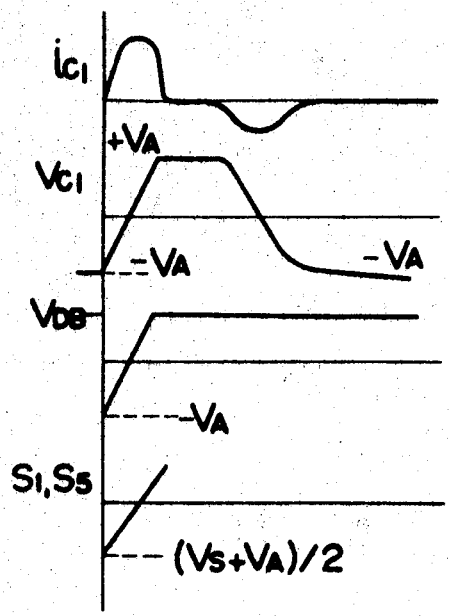
Figure 8:
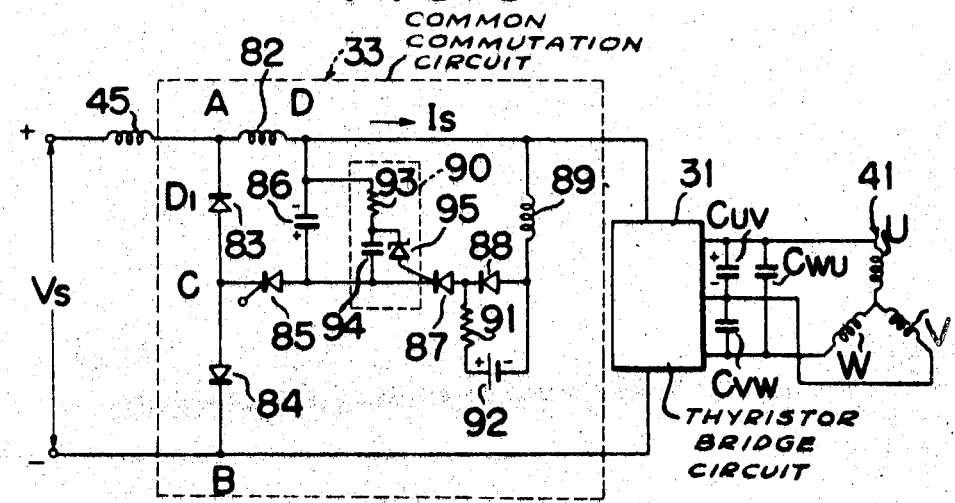

FIG. 4 indicates the circuit connection of an armature where a pair of auxiliary thyristors for commutation have been connected in parallel opposite polarities;

FIG. 5 presents the connection of a common commutation circuit having an improved electronic switching circuit;

FIG. 6 shows the connection of a common commutation circuit according to another embodiment of the invention;

FIG. 7 indicates the wave representations of each part shown in FIG. 6;

FIG. 8 illustrates the connection of a common commutation circuit according to another embodiment of the invention;

FIG. 9 presents the wave representations of each part shown in FIG. 8; and

Figure 10:
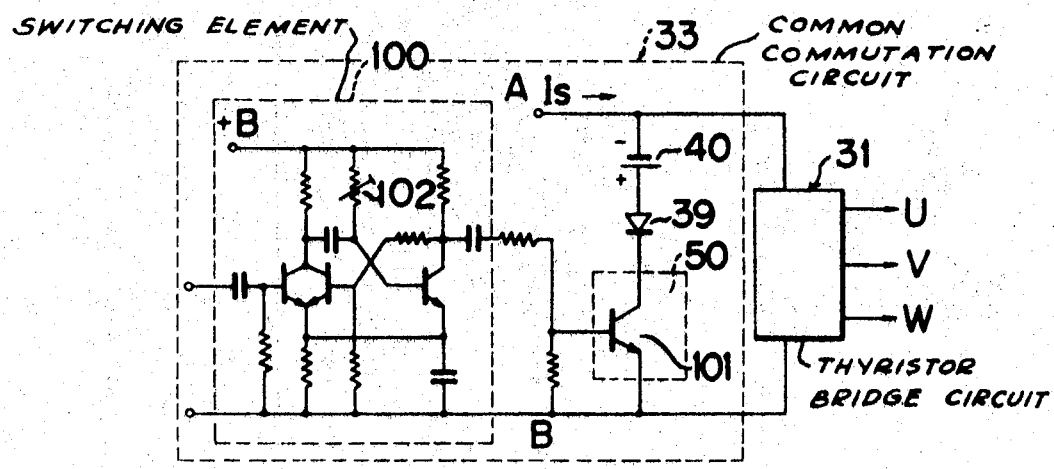

FIG. 10 shows the connection of an improved common commutation circuit according to another embodiment of the invention.

The D.C. motor is generally understood to operate with the magnetomotive force of the armature and that of the field always intersecting each other substantially at right angles regardless of the magnitude of source potential or load, (i.e., under the conditions in which the driving torque always attains a maximum value). The role played by the brush and commutator of the D.C. motor is to change the armature current so as to establish the aforementioned intersecting relationship synchronously with the rotation. A motor wherein the aforesaid function is carried out by a semiconductor switching element or thyristor is known as a brushless motor.

Since the thyristor is fired by the gate signal, it is absolutely necessary that the firing phase be synchronized with the rotor position, and consequently a detector to define the rotor position is required for this purpose. Due to the necessity of connecting a thyristor to an armature, a motor provided with such a position detector is essentially of a rotary field type, wherein the armature is positioned on the stator side to rotate the field system. Consequently the body of this motor may rather be deemed as approximating a synchronous motor.

Figure 1:
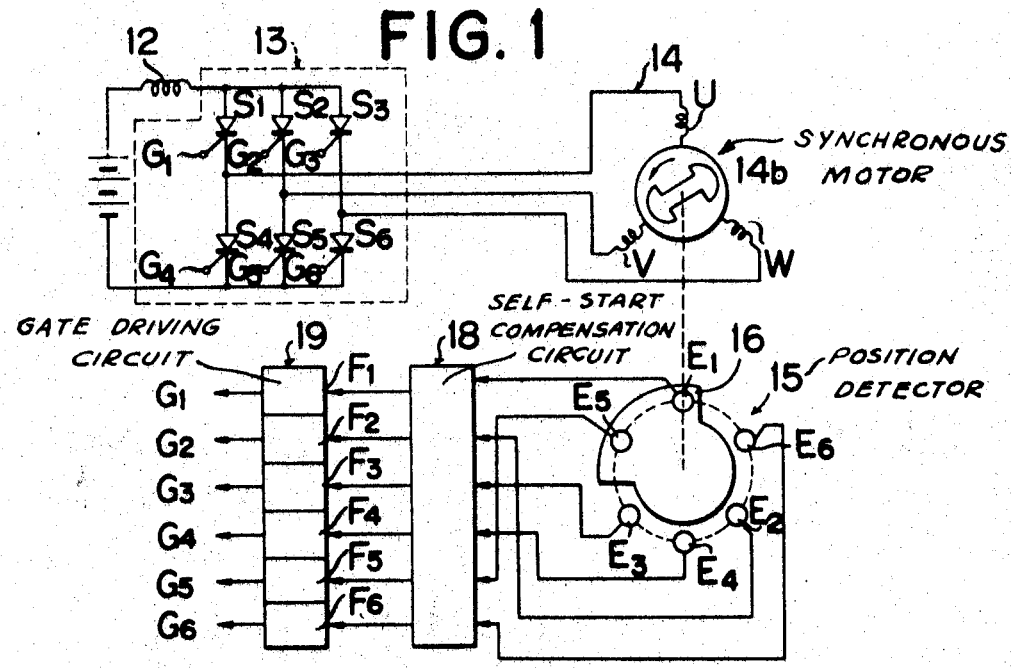
FIG. 1 illustrates the circuit connection of a brushless motor embodying the present invention.

Referring now to FIG. 1, a synchronous motor 14 is operated by introducing power into the windings U, V, W, of an armature by the A.C. output potential of a thyristor bridge 13 using a D.C. source as an input. The angular position of the rotor 14b of the synchronous motor is detected by a position detector 15. The detector is connected to one end of the rotation axis of the rotor 14b. The detector consists of a circular iron plate 16 for detection broken away 240° concentrically on the circumferential edge, and unit approach switches $E_1$ to $E_6$ which are mounted on a circle concentric with the circumferential edge of the iron plate 16 in a manner to face and approach edge of the iron plate 16 in a manner to face and approach each other and radially at intervals of 60° relative to the rotation axis. These units $E_1$ to $E_6$ are covered by the detector plate 16 without contact and electrically turned on at the same time to supply inputs to a self start compensation circuit 18. Upon receipt of the input signal, the the self start compensation circuit 18 is supplied with source potential. The circuit 18 comprises a plurality of transistors, certain pairs of transistors corresponding to the unit switches $E_1$ to $E_6$ which constitute flip-flop elements and circuits $F_1$ to $F_6$ to detect outputs from these flip-flop elements. Of these circuits, outputs from $F_1$ to $F_3$ turn on through the gate driving circuit 19 the gates $G_1$ to $G_3$ of the thyristors $S_1$ to $S_3$ on the positive side and outputs from $F_4$ to $F_6$ similarly turn on the gates $G_4$ to $G_6$ of the thyristors $S_4$ to $S_6$ on the negative side. A D.C. power source is connected across the diagonals of the thyristor bridge 13 through a reactor 12.

Figure 2:
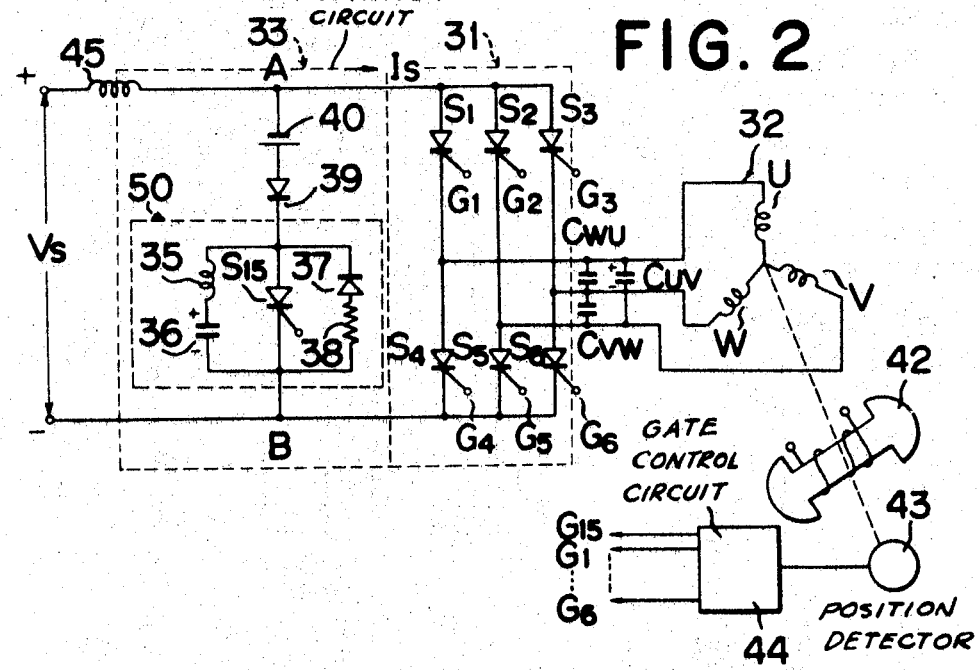
FIG. 2 shows the connection wherein a commutation condenser and a common commutation circuit have been assembled with the brushless motor.

FIG. 2 shows the circuit of a brushless motor having a common commutation circuit. The motor of FIG. 2 is formed from a combination of a three-phase thyristor bridge 31 and a three-phase motor 32 which are constructed in the same manner as 13 and 14 respectively of FIG. 1. Condensers Cuv, Cvw and Cwu are connected to the lines respective on the A.C. side of the thyristor bridge 31 in a delta connection. A common commutation circuit 33 is connected to the D.C. side of the thyristor bridge and a D.C. source $V_s$ is connected across the circuit 33 through a reactor 45.

The common commutation circuit 33 comprises an electronic switching circuit consisting of an auxiliary thyristor $S_{15}$ to short the D.C. side of the thyristor bridge 31, a serial resonance circuit of a reactor 35 and a condenser 36 connected in parallel with the thyristor $S_{15}$ to define the time of shorting, a serial circuit of a diode 37 and a small resistor 38 connected in parallel with the thyristor $S_{15}$ so as to cause said thyristor $S_{15}$ itself to be turned off in the latter cycle of the serial resonance of the first mentioned serial resonance circuit. A diode 39 is serially connected to the thyristor $S_{15}$ of the electronic switching circuit 50 to prevent reverse currents and an auxiliary D.C. source 40 is coupled in series with diode 39.

The thyristor bridge 31 comprises six thyristors $S_1$ to $S_6$ having the gates $G_1$ to $G_6$ respectively. The thyristor bridge 31 is furnished with gate signals synchronized with the position of the rotor 42 by outputs from a gate control circuit 44 consisting of elements 18 and 19 of FIG. 1 through a position detector 43 constructed in the same manner as 15 of FIG. 1. The thyristors are turned on according to the sequence shown in FIG. 3, the respective turn-on periods being 120°.

Of the thyristors constituting the thyristor bridge, only two are turned on at a time. For instance first $S_1$ and $S_5$ and then $S_1$ and $S_6$ are turned on. In this case it will be sufficient to commutate from the thyristor $S_5$ to the thyristor $S_6$ while the thyristor $S_1$ is kept in an "On" state.

According to the embodiment of FIG. 2, however, to simplify the commutation circuit, the thyristors $S_1$ and $S_5$ are forcibly turned off at the time of commutation and thereafter the thyristors $S_1$ and $S_6$ are turned on. The thyristor $S_{15}$ is supplied with gate pulses at each commutation position. The feature of the brushless motor shown in FIG. 2 is that condensers Cuv, Cvw and Cwu are connected to the A.C. side of the thyristor bridge 31 in a delta connection and a common commutation circuit is connected to the D.C. side of the bridge.

There will be described hereinafter the operation of a motor schematically shown in FIG. 2.

Where the motor is operated at the rated capacity, it is set at a value of $\gamma_0=0$ where the commutation advancing angle $\gamma_0$ has a high efficiency and the rate of speed fluctuations is minimized. Let it be assumed that the thyristors $S_1$ and $S_5$ within the thyristor bridge 31 are turned on as described above. Then with the polarity illustrated, the condenser 36 will be charged to an aggregate voltage obtained by adding up the voltags Vs of a D.C. source not shown and the voltage Va of an auxiliary D.C. source. In this embodiment Va is the voltage value of source 40. Due to the turn-on of the thyristors $S_1$ and $S_5$, the condenser Cuv on the A.C. side of the thyristor bridge is charged to approximately Vs volts with the polarity as shown. At the time of commutation, thyristor $S_{15}$ is turned on by the pulse supplied to its gate $G_{15}$. The potential on the D.C. side of the thyristor bridge is changed from approximately from Vs to —Va, and the input current Is of the thyristor bridge 31 is reversed. At the same time thyristor $S_{15}$ forms a resonance circuit of the condenser 36 and reactor 35, allowing a discharge current to flow from the condenser 36. The armature current running from the U phase to the V phase can not be immediately reduced to zero due to its electromagnetic energy, but is fed off to the condenser Cuv. The thyristors $S_1$ and $S_5$ which are in an "On" state, will be turned off after being biased inversely for approximately $2\pi\sqrt{L_1}$ (where $C_1$ represents the capacitance of the condenser 36 and $L_1$ the reactance of the reactor 35) seconds at an aggregate voltage arrived at by adding up the voltage Va of the auxiliary source 40 and Vcuv, provided the capacity of the condenser $Cuv(=Cvw=Cwu)$ is properly designed.

Since the current in the serial resonance circuit of the reactor 35 and the condenser 36 reverses its course after a half cycle of said resonance, the current of the thyristor $S_{15}$ begins to decrease. If, in this case, all the constants involved are so designed as to establish a formula $(Vs+Va) \sqrt{C_1/L_1}$ Is, then the current of the thyristor $S_{15}$ begins to decrease. If, in this case, all the tial between the absolute value of the current flowing through the serial resonance circuit when it reverses its direction and the value of the current Is will flow to the diode 37 and the resistor 38. The voltage drop in the resistor 38 will provide a bias voltage on the thyristor $S_{15}$. If, in this case, the value of $\pi\sqrt{C_1L_1}$ is so adjusted as to be larger than the turn-off time of the thyristor $S_{15}$, it will be automatically turned off.

And after $2\pi\sqrt{C_1L_1}$ seconds, the thyristor is already recovered from the blocked condition, the voltage $V_{11}$ of the reactor 35 is reduced to zero and the condenser 36 is again charged with the polarity shown in FIG. 2, so that the potential on the D.C. side of the thyristor bridge rises and the thyristors $S_1$ and $S_5$ are turned on. In this case the voltage of the condenser 36 is slightly smaller than the voltage $(Vs+Va)$ right before commutation due to a loss in the resonance circuit of the reactor 35 and the condenser 36. However, this deficit will be naturally supplied from the power source. The above described operation will be repeated each time the rotor 42 rotates through an electrical angle of 60°.

The connection of the condensers Cuw, Cvw and Cwu as used in the present invention is carried out in the same manner as the commutation condensers used in the prior art thyristor bridge. However, the system relying only on these condensers has hitherto been deemed as impractical except for use with a resistance load. This was due to the low commutation voltage and the very large oscillation caused by the condenser and the inductance involved in an inductive load.

In the present invention, however, aforementioned condensers display fully practical functions. The reason is, for instance, that as previously described, commutation from the thyristor $S_5$ to the thyristor $S_6$ has hitherto been performed by the voltage of the condenser $C_{vw}$, whereas in the present invention the condenser $C_{uv}$ charged approximately to the source voltage is utilized in commutation. Referring to the oscillation after commutation, although the load, as in the present invention, varies with the capacity of the condenser in the self control type thyristor bridge of a synchronous motor, experiments with 1.4 kilowatt and 10 kilowatt motors have ascertained that the oscillation voltage is only of the order of the source voltage $Vs$ even under a load of 150 percent. If a damper is fitted to the rotor 42, the oscillation will be further reduced. This effect may be accounted for by assuming that the commutation inductance in such case does not arise from a synchronous reactance, but approaches a leakage inductance.

The present invention is further characterised in that the time required for applying reverse bias to the thyristor for commutation is determined only by the resonance period of the reactor 35 and the condenser 36, substantially independent of the voltage $Vs$ and $Va$, current $Is$, smoothing reactor $Ls$, etc. This means that the brushless motor of the present invention is easy to design.

Particularly where a power source consists of a static Ward-Leonard system containing phase control, the smoothing reactor will have relatively large values in order to suppress the ripples. And also in the present invention, while the thyristor $S_{15}$ is turned on, the sum of the voltages of the main and auxiliary sources $(Vs+Va)$ is applied to the reactor 45 and the current increases by $2\pi\sqrt{C_1L_1}$ $(Vs+Va)/Ls$ to the turn-off of the thyristor $S_{15}$ itself. However, if the value $Ls$ of the reactor 45 grows large, increases in the current will be reduced by that extent. Hence, it is desirable to have larger reactor values $Ls$.

Since the commutation capacity is determined by the maximum value $(Vs+Va)\sqrt{C_1L_1}$ of resonance current, all that is required is to design all the constants involved in such a manner that said maximum value exceeds a maximum load current $I_s$ max.

The rotation speed of a brushless motor according to the present invention is in direct proportion to the source voltage $Vs$ and inverse proportion to the field system current as is the case with a D.C. motor. Consequently where it is desired to control the rotation speed of the brushless motor of the present invention particularly over a broad range, such control may be made by the source voltage $Vs$ as is generally practiced with a D.C. motor. Taking in this case a maximum value of the source voltage as $Vs$ max., it will be more reasonable if the values $Va$ of the voltage of an auxiliary source is adjusted according to the main source voltage $Vs$ in such a manner that $Vs+Va=Vs$ max. becomes constant.

Up to this point, there has been described only a three-phase thyristor bridge shown in FIG. 2 according to one embodiment of the present invention. Needless to say, however, the present invention will also be applicable to all connections involving multi-phases more than two phases and other multi-three-phase connection.

Referring to FIG. 4, the electronic switching circuit 50 and auxiliary thyristors for commutation ($S_7$, $S_8$ . . . $S_{12}$) are synchronized with the position of the rotor 42 as shown in FIG. 2 and supply gate pulses at the time of commutation in the sequence shown in FIG. 3. The function of these auxiliary thyristors may be explained by the same description as has been given relative to those shown in FIG. 2. During the rotation of the motor, the thyristors $S_1$ and $S_5$ are turned on. When the turn-on period passes an electrical angle of 60° the thyristor included in the electronic switching circuit 50 and the thyristor $S_7$ will be turned on by being supplied with gate pulses from the position detector 43, (not shown in FIG. 4) the voltage across the points A and B will be reversed from $Vs$ to $-Va$, and the windings U and V of the motor 32 will be shorted by the thyristor $S_7$. The current which has run from the U phase through the V phase will bypass to the thyristor $S_7$ and the D.C. load current which has flowed through the serial reactor 45 to the thyristor bridge 31 will be transferred to the circuit of the auxiliary source 40 and the electronic switching circuit 50. Thus the thyristors $S_1$ and $S_5$ will be biased inversely by the voltage $Va$ of the auxiliary source 40. If, in this case, the period exceeds the turn-off time of these thyristors $S_1$ and $S_5$, they will be recovered from the blocked state, and the "On" period of the electronic switching circuit 50, namely, the period of inverse bias $To$ will be fixed by another circuit (not shown) to set the "On" period.

Upon the lapse of the time $To$, the electronic switching circuit 50 will be turned off, and the voltage across the points A and B will return from $-Va$ to $Vs$. The thyristor $S_1$ will be turned on again and the thyristor $S_6$ will be turned on for the first time. The current which has been bypassed through the thyristor $S_7$ still keeps on flowing against an inverse electromotive force, and will thus soon be reduced to zero so as to turn off the thyristor $S_7$.

Thus in the similar manner, the thyristors $S_7$, $S_8$ . . . $S_{12}$ will repeat the turn-on and turn-off operations.

If, in this case, a maximum value of an inverse electromotive force is taken as $Vm$, the relationship $$V=Vm\cos\left(wt+\frac{\pi}{3}-\gamma_0\right)$$

exists between the inverse electromotive force V to turn off auxiliary thyristors and the commutation advancing angle $\gamma_0$. Consequently even in the case of, for example, $\gamma_0=0$, the inverse electromotive force will have a sufficient magnitude to turn off the thyristors $S_7$ . . . $S_{12}$.

Where commutation is carried out only by means of an inverse electromotive force, this force to carry out commutation from the thyristor $S_5$ to the thyristor $S_6$ as described above may be expressed as $$Vm\cos\left(wt+\frac{\pi}{2}-\gamma_0\right)$$

With $\gamma_0=0$, therefore, the inverse electromotive force will be reduced to zero, making commutation impossible. However, modification as illustrated in FIG. 4 will eliminate the drawbacks of the aforementioned commutation method using only an inverse electromotive force and provide an improved forced commutation method. It is a matter of common knowledge that considering the properties of a brushless motor, if the commutation advancing angle $\gamma_0$ has small values it will improve operating efficiency and minimize fluctuations in rotation speed. Also where a power source consists of a static Ward-Leonard system including phase control, the smoothing reactor 45 is desired to have relatively large values in order to suppress the ripples. This is for the obvious reason that where the voltage $(Vs+Va)$ is impressed on the reactor 45 during the "On" period of the electronic switching circuit 50, large reactor values $Ls$ will reduce the increase of current in the circuit of the electronic switching circuit 50, so that larger reactor values will be more preferable.

FIG. 5 illustrates another embodiment of the common commutation device having an improved switching circuit. The embodiment will be described hereinafter by reference to FIG. 2. In the case of controlling speed by the Ward-Leonard system, common practice to carry out particularly reduction in speed, instant stop and rapid reverse rotation is electronically to change the sequence from the position detector 43 to the gates of the thyristors of the thyristor bridge 31 and apply regenerative braking during part of the speed change process. At this time the thyristor bridge 31 will be changed from a thyristor bridge to a converter type, and in the meantime the voltage polarity on the D.C. side will be reversed. In this case the use of only the common commutation circuit 33 of FIG. 2 will cause a reduction in the load with which the condenser 36 and the thyristor $S_{15}$ are to be charged; Thus there is a greater possibility of the thyristor $S_7$ itself failing to be turned off.

Referring to FIG. 5, connection of a compensation circuit 51 to an electronic switching circuit 50 has enabled the thyristor—the switching element $S_{15}$—in the common commutation circuit 33 to be turned off reliably even at the time of regenerative braking.

The compensation circuit 51 is a serial circuit connection of a diode 46 of the illustrated polarity, a reactor 47, and a second auxiliary source 48 having a voltage $Vb$, connected in parallel with the thyristor $S_{15}$ in the circuit of the electronic switching circuit 50. In this case the value of the voltage $Vb$ is made substantially equal to the maximum value $Vs$ max. of the output voltage of the Ward-Leonard system which constitutes a main power source. In normal operation, therefore, the condenser 36 is charged with an aggregate voltage obtained by summing up $(Vs+Va)$ and $Vb$.

At the time of regenerative braking, however, the polarity of the voltage $Vs$ is reversed, so that the condenser 36 is only charged with the voltage $Vb$ approximately to a value of $Vs$ max., thus enabling the thyristor $S_{15}$ to be turned off with certainty at all times. It is also required to design the inductance of the reactor 47 to be far larger than that of the reactor 35.

An electronic switching circuit provided with a compensation circuit as illustrated in FIG. 5 has the advantage of reliably turning off the thyristor $S_{15}$ even at the time of regenerative braking and carrying out the sequential control of the thyristor bridge and the corresponding regenerative braking reliably and efficiently.

FIG. 6 shows another embodiment of the common commutation circuit system and FIG. 7 illustrates various waveforms therein.

Inserted in series between the points A and B on the thyristor bridge 31 side of the serial reactor 45 are the diode 39 of the illustrated polarity to prevent an inverse current and the auxiliary thyristor $S_{15}$ to short the serial side of the thyristor bridge 31. Connected across the auxiliary thyristor $S_{15}$ is a serial resonance circuit of the reactor 35 and the condenser 36 to obtain a voltage after the shorting of the thyristor $S_{15}$. Connected in parallel with the reactor 35 is a second auxiliary thyristor 65 of the illustrated polarity to short the reactor 35. Connected to the second thyristor 65 is a delay circuit 70 consisting of a resistor 66 to define the turn-on time of the thyristor 65, a condenser 67, and a Zener diode 68. Also provided is an auxiliary source $Va$ 72 of the illustrated polarity to charge the condenser 36 through a resistor 71. The voltage $Va$ of the auxiliary source 72 is made to have substantially the same magnitude as the rated value of the power source voltage $Vs$. The delay circuit 70 is set in such a manner that the first auxiliary thyristor $S_{15}$ is turned on and supplies a firing signal to the second auxiliary thyristor 65 to turn it on after the polarity with which the condenser 36 in the serial resonance circuit is charged is reversed in a time of approximately $\pi\sqrt{C_1L_1}$ seconds.

Referring to FIGS. 6 and 7, it is assumed that the angle of lead of commutation $\gamma_0$ is set at $\gamma_0=0$ where the efficiency is high and the regulation of speed is small, when the electrical motor is rotated at a rated value. As for the thyristors in the thyristor bridge, only $S_1$ and $S_5$ are rendered conductive while others are non-conductive, as described above. The thyristors $S_{15}$ and 65 are also made non-conductive. The capacitor 36 is charged in with polarities as shown with the voltage $Va$ of the auxiliary supply source 72. The capacitor $Cuv$ among the capacitors connected with delta connection on the A.C. side of the thyristor bridge, is charged with polarities as shown to a voltage approximately equal to the voltage $Vs$ of the D.C. supply source, since the thyristors $S_1$ and $S_5$ are made conductive. In this case, when the conduction time of the thyristor $S_5$ reaches 120° in electrical angle as in FIG. 2, a gate pulse from the position detector 43, and accordingly from the gate control circuit 44 will render conductive the first auxiliary thyristor $S_{15}$ to short-circuit the D.C. side of the thyristor bridge. The charge on the capacitor 36 is discharged in the series resonance circuit through the capacitor 36, the reactor 35, the thyristor $S_{15}$ and capacitor 36. The terminal voltage $Vc_1$ of the capacitor 36 is inverted in about $\pi\sqrt{C_1L_1}$ seconds as shown by the waveform in FIG. 7. On the other hand, the points A and B on the D.C. side of the thyristor bridge 31 between which exists the voltage $Vab$ is short-circuited to change the voltage $Vab$ to 0, whereby the input current $Is$ is reversed to the circuit including the reverse flow preventing diode 39 and thyristor $S_{15}$.

The thyristors $S_1$ and $S_5$ of the thyristor bridge 31 rendered conductive are inversely biassed respectively by $Vs/2$ by the voltage across the capacitor $Cuv$ vis $Vs$, current flowing from U-phase to V-phase is bypassed by the capacitor $Cuv$. As previously described, the delay circuit 70 is provided in this embodiment, so that after the charging polarities of the capacitor 36 is inverted in $\pi\sqrt{C_1L_1}$ seconds, the second auxiliary thyristor 65 is made conductive. Thereafter the reactor 35 is short-circuited to cause the load current $Is$ to flow on the thyristor 65 side, the voltage $Vab$ between the points A and B on the A.C. side of the thyristor bridge reaches the inverted voltage $-Va$ of the capacitor 36 as its waveform shows in FIG. 7, and the thyristor $S_{15}$ is turned off. Thereafter, the voltage $Vab$ is increased with a slope determined by the constants of the respective elements and the values of an initial voltage and current. In this case, the initial value of the reverse bias of the thyristor $S_{15}$ is $-Va$, those of the thyristors $S_1$ and $S_5$ of the thyristor bridge are each, as seen from their waveform shown in FIG. 7, expressed by $(Vs+Va)/2$ which is a summation divided by 2 of the charged voltage $Vs$ of the capacitor $Cuv$ and the inverted voltage $Va$ of the capacitor 36. The constants of the respective elements are designed such that the period of reverse bias of each thyristor is longer than a turn-off time inherent to the thyristor even with the maximum load current at starting.

Thus, when the thyristors $S_1$ and $S_5$ of the thyristor bridge and the auxiliary thyristor $S_{15}$ for commutation are turned off and the voltage $Vab$ on the D.C. side of the thyristor bridge is returned to the voltage $+Vs$ of the D.C. power supply source, thyristor $S_1$ is again and thyristor $S_6$ is anew rendered conductive by gate signals from the gate controller 44 (FIG. 2) having been impressed since the time of commutation, thereby to complete the commutation operation. Within a period up to the next commutation, the capacitor 36 is supplied with a voltage of $(Va-Vs)$ through the resistor 71 from the auxiliary power supply source 72 to be charged with the polarities of the voltage $Va$ as shown. The above operations are repeated every time the rotor is rotated by an electrical angle of 60°.

The function of the short-circuit device for short-circuiting the reactor 35, which device includes the second auxiliary thyristor 65 and the delay circuit 70 and constitutes a characterising feature of this embodiment, is now to be described. Where this short-circuit device is not included, when the resonance between the capacitor 36 and the reactor 35 is over, the load current $Is$ flowing through the thyristor $S_{15}$ will be shifted to the resonance circuit. In this case, although dependent upon the inductance of the series reactor 45, the voltage across the points A and B (FIG. 6) becomes $$-Vs + L_1 \frac{dIs}{dt}$$

namely, the reverse bias voltage thereof is decreased by the voltage drop across the reactor 35. In contrast, in this embodiment, the second auxiliary thyristor 65 is rendered conductive after $\pi\sqrt{C_1 L_1}$ seconds to short-circuit the reactor 35 so that the above-mentioned reduction in the reverse bias voltage is prevented. The value of the reverse bias of the commutating thyristor $S_{15}$ can reach substantially the predetermined value $-Va$ and that of each thyristor of the thyristor bridge can be made substantially the predetermined value $(Vs+Va)/2$, with the result that the present embodiment is improved in the ability of commutation when compared with prior art systems and is effective particularly at starting and under heavy load. The second auxiliary thyristor 65 is connected in series with the capacitor 36, and is automatically turned off after completing commutation.

Referring to FIGS. 8 and 9, a further embodiment of the common commutation circuit is described. In series with the series reactor 45, a reactor 82 is provided. Diodes 83, 84 of polarities as shown are inserted in series with each other between points A and B. Between a point C between the diodes 83, 84 and a point D on the thyristor bridge side of the reactor 82, the series combination of a capacitor 86 and a first auxiliary thyristor 85 of polarities as shown is coupled to provide a first resonance circuit for short-circuiting the D.C. side of the thyristor bridge. From a point between the thyristor 85 and the capacitor 86, a second thyristor 87 of polarity as shown is connected in series through a third diode 88 of polarity as shown and a reactor 89 to form a second resonance circuit together with the capacitor 86, to the point D of the reactor 82. Across the third diode 88 is connected an auxiliary power supply source 92 of polarity as shown is in series with a resistor 91. These constitute a charging circuit for the capacitor 86 and the operation thereof is controlled by the thyristor 87. A delay circuit 90 consisting of a resistor 93, a capacitor 94 and a Zener diode 95 is incorporated as shown. The delay circuit 90 operates after the thyristor 85 for short-circuiting the D.C. side of thyristor bridge, to give the second thyristor 87 an ignition signal thereby rendering it conductive. The voltage $Va$ of the auxiliary source 92 is set to be substantially equal to the rated value of the main supply source voltage $Vs$. Consequently, the inductance $Ls$ of the series reactor 45 and that $L_1$ of the reactor 82 of the first resonance circuit are selected to be $Ls > L_1$.

This arrangement of FIG. 8 is operated as follows. It is assumed now that when the motor is rotated at a rated speed, the angle $\gamma_0$ of lead of commutation has a value at which the efficiency is high, namely $\gamma_0$ is set equal to 0. It is also assumed that the thyristors $S_1$ and $S_5$ included in the thyristor bridge are rendered conductive as in the previous description. The capacitor 86, as will be described hereinbelow, is charged by the auxiliary source voltage $Va$ with polarities as shown, viz. in opposite polarity to that of the main source voltage $Vs$. Since thyristors $S_1$ and $S_5$ are conductive, the capacitor $Cuv$ among the capacitors connected in delta connection on the A.C. side of the thyristor bridge is charged with polarity as shown with a voltage substantially equal to the voltage $Vs$ of the main power supply source.

As in the sequence shown in FIG. 3, when the conduction time of the thyristor $S_5$ of the thyristor bridge reaches an electrical angle of 120°, a gate pulse from the gate control circuit 44 through the position detector 43, renders the first auxiliary thyristor 85 conductive. Since, as described above, the inductances of the series reactor 45 and the reactor 82 have a relation expressed by $Ls > L_1$, the capacitor 86 are discharged through the first series resonance circuit consisting of the thyristor 85, the diode 83, the reactor 82 and the capacitor 86. The discharge current $Ic_1$ of the capacitor 86 varies as shown by the waveform in FIG. 9, and the voltage $Vc_1$ thereof changes from the negative voltage $-Va$ to a positive voltage as shown by the waveform in FIG. 9 as the discharge proceeds since said voltage $Vc_1$ is opposite in polarity to the supply source voltage $Vs$. In this case, since the points D and B on the thyristor bridge D.C. side are coupled through the capacitor 86, the voltage $Vdb$ between these points is inverted to $-Va$ as shown by the waveform in FIG. 9 as soon as the thyristor 85 is made conductive, and thereafter the voltage $Vdb$ reaches the positive voltage $+Va$ with substantially the same waveform as the capacitor 86. The voltage $Vdb$ between the points D and B is applied as a reverse bias voltage to the thyristor bridge. Since the capacitor $Cuv$, as previously said, is charged substantially with the source voltage $Vs$, the thyristors $S_1$ and $S_5$ rendered conductive are reverse biased by the summation on the voltage $Va$ of the capacitor $Cuv$ and the voltage $Vdb$ by means of the reverse bias circuit including the capacitor 86, the thyristor 85, the diode 84, the thyristor $S_5$, the capacitor $Cuv$, the thyristor $S_1$ and the capacitor 86. As a result the thyristors $S_1$ and $S_5$ each is reverse biased by a half of the sum voltage, so that each is turned off. The initial reverse bias voltage of each of the thyristors $S_1$ and $S_5$ is equal to $(Vs+Va)/2$. Armature current flowing from U-phase to V-phase cannot be immediately reduced to zero because of its electromagnetic energy and is branched into the capacitor $Cuv$. Current $Is$ having been flowing into the thyristor bridge, as described above, flows through the circuit including the capacitor 86, the thyristor 85 and the diode 83 simultaneously with the conduction of the thyristor 85, which makes it possible that the current in backward direction of the diode 83 reaches in the magnitude of that the forward direction. Current components flowing through the reactor 81 flow back to the main power supply source via the diodes 83 and 84, and the main source voltage $Vs$ is applied to the series reactor 45.

When the thyristor 85 is turned on, the thyristor bridge is turned off in the manner described above. When the voltage $Vc_1$ of the condenser 86 is inverted by resonance to have a value larger than $Vs$, the diode 84 is inversely biased so that the thyristor $S_1$ fed with the gate signal since the time of commutation, and the thyristor $S_6$ will be again turned on. The relationship between the currents $ic_1$ and $i_{L1}$ across the condenser 86 and the reactor 82 respectively can be expressed by $i_{c1}=i_{LS}>Is$, then the voltage $Vc_2$ across the condenser 86 becomes equal to the voltage $Vs$ of the main source to hold the relationship $i_{L1}=Is$. Thus, when $i_{c1}=i_s(85)=0$, the thyristor 85 is turned on.

As has been stated, when the second auxiliary thyristor 87 is turned on by the delay circuit after turning-off of the thyristor 85, a resonance circuit comprising the condenser 86, second reactor 89, diode 88 and thyristor 87 resonates, and the ccharge on condenser 86 is again reversed to a polarity as shown approximately after $\pi\sqrt{C_1 L_2}$ seconds. Due to a circuit loss, that portion of voltage that is lower than the value of the voltage $Va$ of an auxiliary power source 92 is supplied through a current limiting resistor 91 from the auxiliary power supply 92 (in this instance the current supplied has a polarity opposite to that of a discharge current and hence can be represented by waveforms in FIG. 9.) As soon as a charging voltage $Vc_1$ reaches the value of $-Va$ so as to be ready for a succeeding commutation, the thyristor 87 is turned off. The above process is repeated every time the rotor 42 completes its rotation by an electrical angle of 60°. It should be understood that the values of the condenser 86 and the reactor 82 are so selected that a period for inverse biasing of each thyristor of the thyristor bridge exceeds the turn-off period inherent to the thyristors even at the maximum load current at the time of starting. The value of reactance of the reactor 89 is determined with consideration to the maximum speed of rotation of the rotor 42.

From the foregoing description it will be apparent that the feature of the embodiment of FIG. 8 resides in the division of the series reactor into parts 45 and 82 and in the provision of the diode 83. In a conventional commutation circuit wherein the corresponding reactor 82 and the diode 83 are omitted from the circuit shown in FIG. 8, when the thyristor 85 is turned on at the time of commutation, load current $I_s$ is commutated to flow through a series circuit comprising the condenser 86, thyristor 85 and the diode 84 via the reactor 45. Accordingly a transient inverse bias resulted when the discharge of condenser 86 is affected by the amount of the load of the motor, viz the vector quantity of current $I_s$. The period of inverse biasing is shortened particularly at the time of heavy load, and further its phase is transferred so that the thyristors in the thyristor bridge are not easily turned off. These relationships can be adjusted by suitably setting the constants of the reactor 45 and the condenser 86.

According to this embodiment, the series reactor 45 and the reactor 82 are arranged to have the relation $L_s > L_1$ and the diode 83 is connected in series with the diode 84, so that the condenser 86 will discharge through the diode 83 and the reactor 82 upon turning-on of the thyristor 85 at the time of commutation. In other words, the condenser 86 and the reactor 82 are arranged to form a series resonance circuit. Therefore, a transient condition of discharging of the condenser 86 is restricted substantially only by the reactor 82 and the condenser 86 and is not affected by the condition of charges and the power supply. This provides an extremely wide range of optionally selecting the constants of the reactor 45, reactor 82 and so on. Since current flowing through the reactor 45 passes from a circuit including the diode 83 to that including the diode 84, and the power supply voltage $V_s$ is impressed upon the reactor 45, the decrease in the value of the inverse bias voltage can be effectively avoided. The capability in commutation can be greatly improved when compared with that in the conventional device. This is particularly effective at the time of starting and heavy load.

The foregoing embodiments have been described by reference to three phase motors. But it should be understood that the principle of the invention is equally applicable to all polyphase motors as well as to those of multiplex winding-three phase connection.

In FIG. 10, a semiconductor switching element 101, such as, transistor is used in place of the thyristor $S_{15}$. This eliminates the necessity for providing the resonance circuit (a series circuit including the inductance 35 and the condenser 36) in the short circuit and the series circuit including the diode 37 and the resistor 38 in FIG. 2. This not only contributes to the simplification of the circuitry, but also to the improvement in the controlling characteristics by eliminating the difficulty in commutation of the thyristors.

The brushless motor of FIG. 10 includes, as has been described already, the three phase synchronous motor 32 and the thyristor bridge 31. The three phase synchronous motor 32 comprises the armature 41 and the rotor 42, and the position detector 43 is provided to control the gate control circuit 44.

The common commutation circuit 33 comprises an electronic switching circuit 50 including a switching element 101 such as transistor, an auxiliary power supply 40, a diode 39 and a time setting circuit 100 for setting the on-time of the switching element, for the purpose of short-circuiting the D.C. side of the thyristor bridge 31.

With the thyristor bridge 31, the thyristors $S_1$, $S_5$ are forcedly turned off and thereafter the thyristors $S_1$ and $S_6$ are turned on, with the result that the arrangement of a commutation circuit is simplified. Further, the switching element 101 is fed with gate pulses at the commutating position of each thyristor.

When the motor is under rated operation, the angle $\gamma_o$ of lead for commutation is set at $\gamma_o = 0$ where efficiency is high and speed variation is small. In this case, it is assumed that the thyristors $S_1$ to $S_6$ of the thyristor bridge 31 operate in the manner mentioned above and that the thyristors $S_1$ and $S_5$ are in on-condition. One of condensers $C_{uv}$ which are in delta connection with the A.C. side of the thyristor bridge is charged to a value close to $V_s$ since the thyristors $S_1$, $S_5$ the on-condition. When commutation takes place, gate pulses are provided from the gate control circuit 44 (FIG. 2) to the switching element 101 to turn it on, and the potential on D.C. side of the thyristor bridge 31 is inverted approximately from $+V_s$ to $-V_a$, thereby reversing load current $I_s$ to the short circuit and causing the switching element 101 to be simultaneously turned on.

On the other hand, the armature current flowing from U-phase to V-phase can not immediately reach the value of zero due to its electromagnetic energy, but is divided to $C_{uv}$. The thyristors $S_1$, $S_5$ are impressed by a total voltage composed by the voltage $V_a$ of the auxiliary power supply 40 and the terminal voltage of the condenser $C_{uv}$, and are turned off by being inversely biased during the turn-on period of the switching element set by the time setting circuit 100, if the capacity of the condenser $C_{uv}$ ($C_{uv} = C_{vw} = C_{wu}$) is suitably designed.

The time setting circuit 100 is exemplified by a monostable multivibrator in FIG. 10. This time setting is made by a variable resistor 102. If this time setting is represented by T, T will convert the polarity of D.C. input voltage of the thyristor bridge 31 only when it exceeds the turn-off time of the thyristors $S_1$, $S_5$ thereby to make the thyristor bridge 31 operative.

While the invention has been described in connection with some preferred embodiments thereof, the invention is not limited thereto and includes any modifications and alterations which fall within the true spirit and scope of the invention.

What is claimed is:
1. A brushless motor comprising:
a source of D.C. power;
a first reactor series coupled with said source to suppress the ripples of said source;
a thyristor bridge circuit comprising a plurality of semiconductor thyristor switching elements;
a motor coupled to the A.C. outputs of said thyristor bridge circuit, said motor being driven by said bridge circuit;
a detector coupled to said motor to indicate the position of a rotor in said motor;
a gate control circuit coupled to the outputs of said detector to supply pulses to the gate electrode of each of the thyristors of said thyristor bridge circuit to control the turn-on of said thyristors in a prescribed sequence; and
a common commutation circuit including:
pairs of auxiliary semiconductor switching elements connected to the A.C. outputs of said thyristor bridge circuit in a delta connection, the switching elements of each pair being connected in parallel with each other and with opposite polarities;
an auxiliary D.C. power source; and
an electronic switching circuit series coupled with said auxiliary source and including a first semiconductor switching means controlled by said gate control circuit so that said switching means is turned on for a period of time greater than the turn-off time of the semiconductor switching elements of said bridge circuit, said auxiliary source and said switching circuit being coupled in parallel with the D.C. input side of said thyristor bridge circuit to constitute an auxiliary D.C. power source for said thyristor bridge circuit.

2. The brushless motor according to claim 1 comprising auxiliary condensers connected in a delta configuration to the armature windings of said motor.

3. The brushless motor according to claim 1 wherein said common commutation circuit further includes a first auxiliary D.C. source connected to said first reactor; and a first diode series coupled with said first auxiliary source and with said first semiconductor switching means to prevent means to prevent inverse current flow.

4. The brushless motor according to claim 1 wherein said common commutation circuit includes:
a serial resonance circuit including a first diode coupled to the D.C. input side of said thyristor bridge circuit to prevent inverse current flow, said first semiconductor switching means being further coupled in series with said first diode; and a second reactor series coupled with a first condenser, said second reactor and first condenser being coupled in parallel with said first semiconductor switching means; and
a delay circuit including an auxiliary power source coupled to charge said first condenser in said serial resonance circuit, and a second semiconductor switching element coupled in parallel with said second reactor in said serial resonance circuit to selectively short out said second reactor.

5. The brushless motor according to claim 1 wherein said common commutation circuit includes:
a serial resonance circuit including a second reactor series coupled with said first reactor, a first condenser series coupled with said second reactor, the junction of said first condenser and second reactor being coupled to the input side of said thyristor bridge circuit, a first diode coupled to the junction of said first and second reactors, said first semiconductor switching means bring coupled in series with said first diode;
a charging circuit for selectively charging said first condenser;
a second auxiliary semiconductor switching means coupled to said charging circuit and controlling said charging circuit;
a second diode coupled to said resonance circuit to prevent inverse current flow; and
a delay circuit coupled to said second semiconductor switching means to turn on said second switching means a predetermined period of time after the turn-on of said first semiconductor switching means to charge said first condenser in said serial resonance circuit.

6. The brushless motor according to claim 1 wherein said common commutation circuit includes a time-setting circuit coupled to the output of said gate control circuit; and means coupling the output of said time-setting circuit to said electronic switching circuit to cause said switching circuit to repetitively turn on and off when the time defined by the time-setting circuit is greater than the turn-off time of the semiconductor switching element of said thyristor bridge to thereby reverse the polarity of said thyristor bridge.

7. The brushless motor according to claim 3 wherein said common commutation circuit further includes:
a serial resonance circuit connected in parallel with said first semiconductor switching means, said serial resonance circuit including the series combination of second reactor and a first condenser connected in parallel with said first semiconductor switching means; and
a serial circuit consisting of a second diode and a resistor connected in parallel with said series resonance circuit.

8. The brushless motor according to claim 7 further comprising a compensation circuit connected in parallel with said first semiconductor switching means, said compensation circuit including the series combination of a second auxiliary power source, a third reactor having a greater value of inductance than that of said reactor, and a third diode.

References Cited

UNITED STATES PATENTS

| | | | |
|---|---|---|---|
| 3,214,663 | 10/1965 | Kreutzer | 318—138 |
| 3,222,582 | 12/1965 | Heyman et al. | 318—345 XR |
| 3,299,336 | 1/1967 | Johannes | 318—138 |
| 3,333,171 | 7/1967 | Platnick | 318—138 |
| 3,354,370 | 11/1967 | Corry et al. | 318—227 |
| 3,384,804 | 6/1968 | Salihi | 318—138 XR |
| 3,406,325 | 10/1968 | Rosa | 318—227 XR |
| 3,423,662 | 1/1969 | Schlabach et al. | 318—138 |

ORIS L. RADER, Primary Examiner

G. Z. RUBINSON, Assistant Examiner

U.S. Cl. X.R.

318—254